(No Model.) 2 Sheets—Sheet 1.

R. B. CODLING.
TURNING MACHINE.

No. 379,307. Patented Mar. 13, 1888.

Witnesses.
John Edwards Jr.
Theodore Brockway.

Inventor.
Robert B. Codling,
By James Shepard
Atty.

(No Model.) 2 Sheets—Sheet 2.
R. B. CODLING.
TURNING MACHINE.
No. 379,307. Patented Mar. 13, 1888.
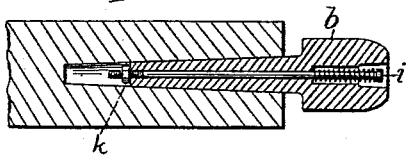
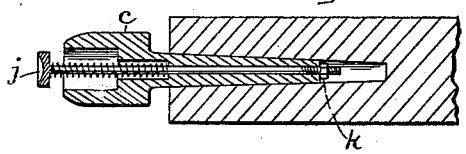
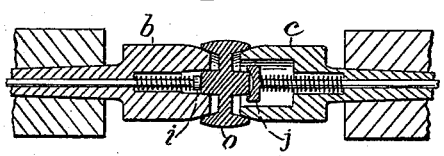
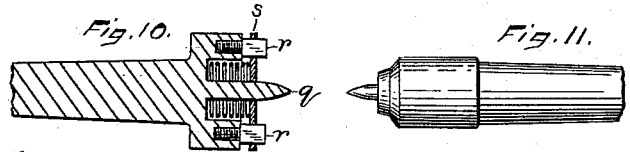
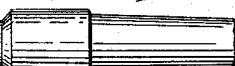
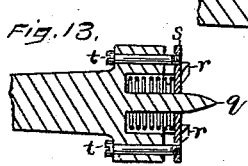
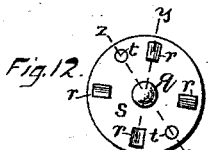
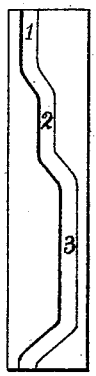
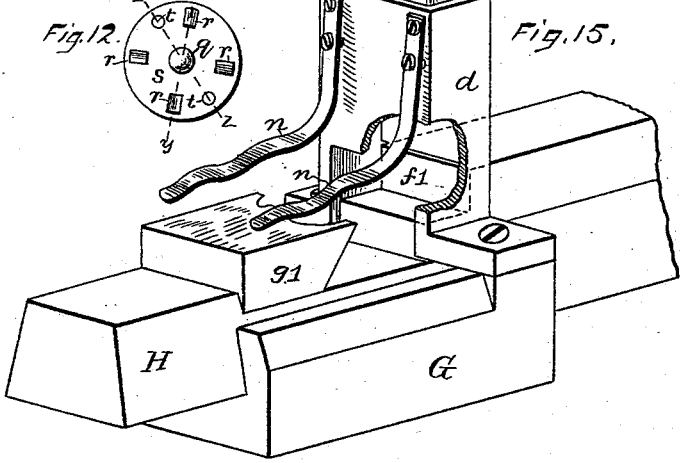
Witnesses.
John Edwards Jr.
Theodore Brockway
Inventor.
Robert B. Codling.
By James Shepard Atty.

UNITED STATES PATENT OFFICE.

ROBERT B. CODLING, OF BRISTOL, CONNECTICUT.

TURNING-MACHINE.

SPECIFICATION forming part of Letters Patent No. 379,307, dated March 13, 1888.

Application filed October 11, 1887. Serial No. 252,038. (No model.)

*To all whom it may concern:*

Be it known that I, ROBERT B. CODLING, a citizen of the United States, residing at Bristol, in the county of Hartford and State of Connecticut, have invented certain new and useful Improvements in Machines for Turning, of which the following is a specification.

My invention relates to machines for turning articles of metal, wood, or other material; and the object of my invention is to produce an automatic machine whereby the work is done at less expense and with greater uniformity than is the case with hand-turning.

Figure 1:
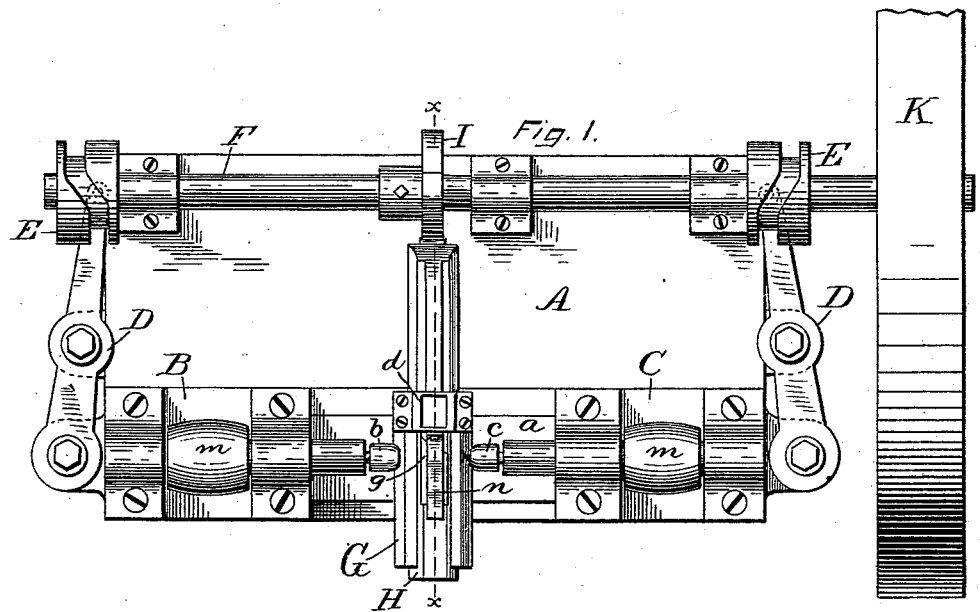
Figure 2:
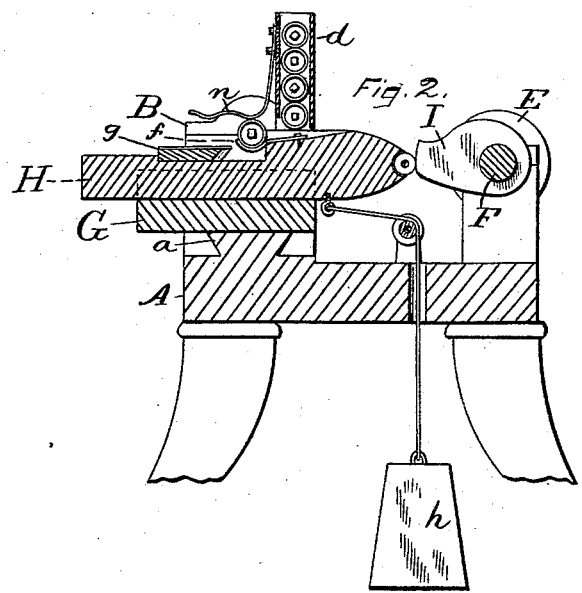
Figure 3:

In the accompanying drawings, Figure 1 is a plan view of my machine as specially adapted for turning caster-rollers. Fig. 2 is a vertical section of the same, partly in elevation, on line $xx$ of Fig. 1. Fig. 3 is a plan view of the chisel or turning-tool. Fig. 4 is a longitudinal section, partly in elevation, of the driving-center. Fig. 5 is a like view of the opposite or companion center. Fig. 6 is a like view of both centers with a caster-roller held between them. Figs. 7 and 8 are respectively side and end views of a driving-center for use in my machine for finishing caster-rollers. Fig. 9 is a side elevation of another form of metal article which may be turned on my machine. Fig. 10 is a central longitudinal section, partly in elevation, of a driving-center for my machine specially adapted for turning wood, the plane of section being indicated by the line $yy$, Fig. 12. Fig. 11 is a side elevation of the opposite center for turning wood. Fig. 12 is an end view of the driving-center, Fig. 10. Fig. 13 is a view of the same corresponding with Fig. 10, the plane of section being on the line $zz$ of Fig. 12. Fig. 14 is a developed view of the cam for operating the centers in turning wood, and Fig. 15 is a perspective view of a chute and slide having a carrier and turning-tool adapted for use on my machine for turning door-stops.

A designates the bed of the machine, having upon its front side longitudinal ways or guides $a$, upon which are mounted two sliding heads, B C, the former carrying the driving-center $b$ and the latter carrying the opposite or companion center, $c$. To each sliding head a lever, D, is connected, which lever is pivoted to the bed A and has its opposite end resting in the grooved cams E on the cam-shaft F, whereby the heads B C are moved to and from each other at every revolution of the cam-shaft F, the cam-grooves being straight between the inclined portions, so that the heads B and C have a period of rest at each limit of their movement.

Between the heads B and C there is a supplementary bed, G, bearing a chute, $d$, for receiving a stack of blank caster-rollers, as shown in Fig. 2, and underneath said chute is a slide, H, provided with a carrier, $f$, and chisel or turning-tool $g$. The slide H is drawn backward by means of the weight $h$ and is thrown forward by means of the cam I on cam-shaft F. As represented in Fig. 1, the slide H is in its rearmost position, while in Fig. 2 it is in its foremost position.

As will be seen by reference to Fig. 2, the hubs of the casters are made square in end view and the driving-center $b$ is provided with a socket of corresponding shape, within which one of said square hubs of each roller is received. A spring-pressed follower, $i$, is arranged within the driving-center $b$ and a like follower, $j$, is arranged within the companion center, $c$. These spring-pressed followers are limited in their outward movements by nuts $k$, Figs. 4 and 5, and are preferably so arranged that when released the end of the follower in the center $b$ will not project beyond the mouth of the socket, while the follower in the center $c$ will slightly project from said center, all as shown in Figs. 4 and 5. While the square socket in the center $b$ engages the square hub of the caster-roller for driving it, the roller is centered upon both sides by the centers bearing upon the inside of its rim, as shown in Fig. 6. The cam-shaft F is driven slowly by any suitable means—as, for instance, by means of a belt and a driving-pulley, K—while the spindles which carry the centers of both heads are driven rapidly by belts upon the pulleys $m$.

When the cams E E operate to hold the heads B C apart, as shown in Fig. 1, the cam I is in such a position as to permit the weight $h$ to draw the slide H backward to a point where the carrier $f$ is immediately under the chute $d$, and the lowermost caster within the chute drops into the hollow of the carrier, which carrier is made in the form of a flat spring, curved as shown in Fig. 2. The cam I then throws the slide H forward into the position represented in Fig. 2 to bring the roller that rests on the carrier into alignment with the centers $b$ and $c$, the spring $n$ holding the roller within the carrier $f$ until the centers $b$ and $c$ have been advanced by their cams far enough to engage the roller. As the centers approach each other, the follower $j$ first strikes the hub of the caster-roller, so as to insure the hub on the opposite side entering the square socket in the center $b$. In advancing from the position shown in Figs. 4 and 5 to the position shown in Fig. 6 the followers yield and permit the caster-roller to be held as there shown. Immediately after the centers take the caster-roller, the highest point of the cam I passes the rear point of the slide H, when said slide moves backward under the influence of the weight $h$, the forward end of the spring-carrier $f$ yielding a little as the carrier withdraws from the caster-roller. The centers revolve in such a direction as to carry their under side toward the front. As the slide moves backward, following up the cam I, the chisel $g$ turns the periphery of the caster-roller.

The form of the chisel in plan view is shown in Fig. 3, while its top is hollowed out, so as to conform in transverse section or end view to the rounded periphery of the caster-roller, Fig. 6. After the chisel has passed under the caster-roller sufficiently to turn its periphery and to bring the carrier $f$ again under the chute to receive another roller, the operation before described is repeated indefinitely so long as the machine is supplied with caster-rollers. The chute may be extended to any desired height, and can be fed from a hopper, into which the castings are placed promiscuously.

When the centers withdraw from each other, the spring-pressed followers act to eject the rollers, so that the centers are ready to receive another roller. I have described the lathe-heads B and C as sliding, and this is the preferred form; but sliding spindles are an equivalent for sliding heads.

In Figs. 7 and 8 I have shown a driving-center which may be used upon my machine for driving caster-rollers that have been drilled, the square of the center taking into the axial hole of the caster at the hub on one side. This is more particularly designed for use when only a very light shaving or burnishing of a previously-turned caster-roller is desired.

Fig. 9 shows in side elevation an article of metal which may be turned on my machine by merely changing the form of the chisel $g$ to conform to the periphery of the article, Fig. 9, said article being provided with a square hub, $p$, for driving it when within the centers; but, inasmuch as there is a square hub upon one end of the article only, and the article is differently shaped at each end, it is necessary in stacking the blanks within the chute to arrange them all with the square hub upon that side which faces the driving-center. Wooden articles or those of other material may also be turned upon my machine.

In Fig. 15 the slide H is provided with an angular recess to form the carrier $f'$, so as to adapt it to receive a square block from the chute $d$. The chisel $g'$ is shaped in plan view to conform to the periphery of the article to be turned and is placed higher than the chisel $g$ for turning caster-rollers, in order to adapt the chisel to be presented to the front of the work being turned instead of passing under it, the work being driven in the opposite direction from that first described for driving caster-rollers.

The driving-center, Figs. 10, 12, and 13, is provided with a central spur, $q$, for first entering the block of wood, and with driving-points $r$ similar to those ordinarily used for driving wood for turning. In connection with this center I also arrange a spring-pressed follower, $s$, the same being provided with openings which receive the points $r\ r$, while the follower is limited in its outward movement by the screws $t\ t$. A developed view of the cams for forcing these centers together is shown in Fig. 14, the operating-levers having their ends in the straight part 1 of the groove of said cam when the centers are the most widely separated. When the levers pass the incline leading to the part 2 of the cam-groove, the centers are brought near enough together to catch the work by the central points, and when the work is so caught the slide H will move backward far enough to withdraw the carrier $f'$ from under the block and permit the block to revolve. The levers then follow up the next incline into the part 3 of the cam-groove, thereby bringing the centers nearer together and forcing the driving-spurs $r\ r$ firmly into the wood, the follower $s$ yielding a little as said spurs enter the wood. With the work thus held the turning tool or chisel is brought against the work for turning and to bring the carrier $f'$ again under the chute. When the cams and levers withdraw the centers from each other, the spring-pressed follower $s$ starts the work off from the spurs, so that it falls from the machine, and the operation is repeated indefinitely.

The machine is adapted for turning various articles with only such changes as I have herein indicated to conform to the particular work desired. Having described three different forms of work, I consider it unnecessary to describe or specify other forms. I also consider it unnecessary to specify such minor changes in my machine as would be obvious to a mechanic. The hollowing or concave face of the follower $j$ may be useful with a companion center or chuck other than the center $b$, said face acting to temporarily center the work while it is being forced into the driver and before the periphery of the center $c$ near its outer end engages the rim of the caster-roller to more firmly center it.

I claim as my invention—

1. In a turning-machine, the combination of two lathe-centers adapted to move longitudinally, a carrier and turning-tool moving together between said centers at right angles to their axis, a chute fixed over the path of the carrier for feeding work thereto, and operating mechanism for imparting the relatively-timed movements to said centers, carrier, and turning-tool, substantially as described, and for the purpose specified.

2. In a turning-machine, the combination of lathe-centers and a chute respectively adapted to revolve the work and to hold blanks, the slide H, moving between the lathe-centers at right angles to their axes and provided with a carrier and turning-tool, and mechanism for reciprocating said slide, substantially as described, and for the purpose specified.

3. In a turning-machine, the combination of a chute for holding blanks, the slide having the yielding carrier $f$, adapted to move under the chute to receive a blank and then to move away and carry a blank therefrom, and mechanism for grasping the blank when on the carrier, whereby the yielding of the carrier $f$ when the work is grasped permits the return movement of the carrier to receive another blank, substantially as described, and for the purpose specified.

4. In a turning-machine, the combination of mechanism for grasping the work, the reciprocating slide provided with a carrier, the chute $d$, for holding blanks, and the spring $n$, for holding the blank within the carrier during its advance movement, substantially as described, and for the purpose specified.

5. In a turning-machine, the combination of the lathe-centers mounted to move longitudinally, the slide bearing a turning-tool and carrier, the chute over the path of the carrier, the levers D D, cams E E, and the cam I, substantially as described, and for the purpose specified.

6. In a turning-machine, the combination of the driving-center and the spring-pressed follower at its outer end adapted to start the work from off said center, substantially as described.

7. In a turning-machine, the centers herein described for turning caster-rollers, said centers having axial openings to admit the hubs of said rollers and having their peripheries near their outer ends adapted to enter the rims and center the rollers thereby, substantially as described.

8. In a turning-machine, the combination of a driving-center and the companion center, and the spring-pressed follower $j$, having a central depression for temporarily centering the work, substantially as described.

9. In a turning-machine, the combination of the driving-center having a spring-pressed follower limited in its outward movement to a point inside the outer end of said center, and the companion center having the spring-pressed follower which projects beyond the outer end of said center, substantially as described, and for the purpose specified.

ROBERT B. CODLING.

Witnesses:
 JAMES SHEPARD,
 JOHN EDWARDS, Jr.